Figure 1:
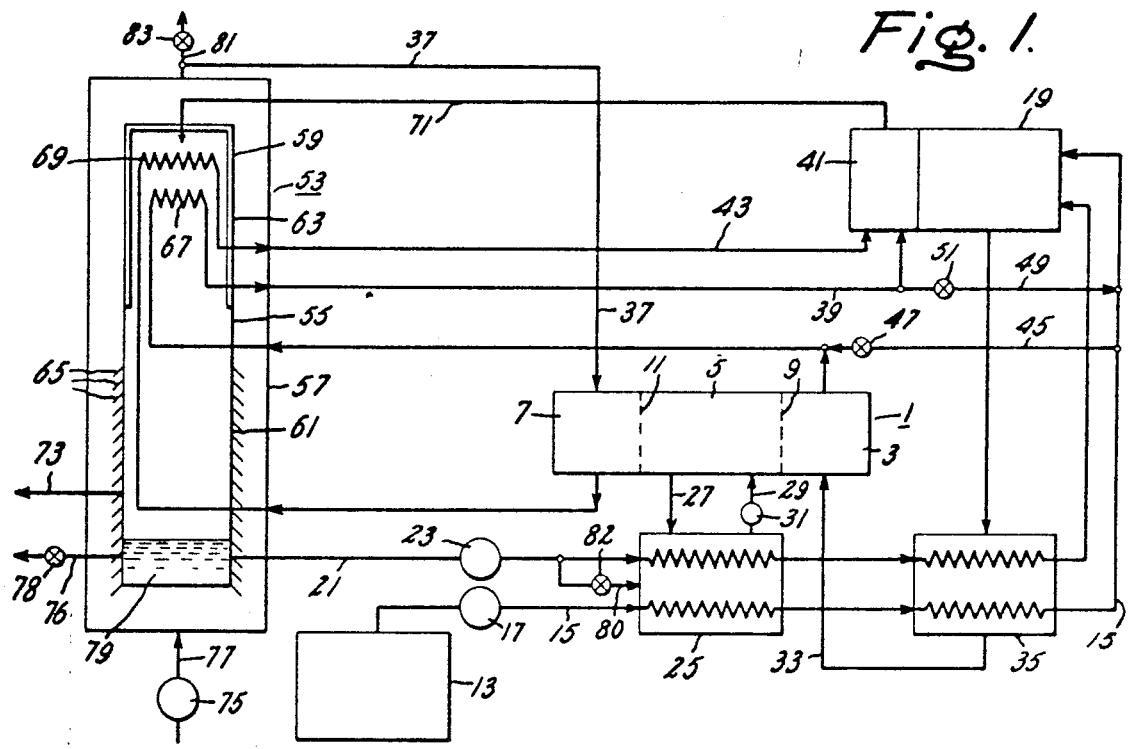

United States Patent

[11] 3,615,850

| [72] | Inventors | Paul Chludzinski<br>Lynn;<br>John Ward Harrison, Manchester, both of Mass. |
|---|---|---|
| [21] | Appl. No. | 845,923 |
| [22] | Filed | Mar. 10, 1969 |
| [45] | Patented | Oct. 26, 1971 |
| [73] | Assignee | General Electric Company<br>Continuation of application Ser. No. 546,326, Apr. 29, 1966, now abandoned. |

[54] SYSTEM AND PROCESS EMPLOYING A REFORMABLE FUEL TO GENERATE ELECTRICAL ENERGY
12 Claims, 4 Drawing Figs.

[52] U.S. Cl. ............................................. 136/86
[51] Int. Cl. ........................................ H01m 27/14
[50] Field of Search ................................. 136/86

[56] References Cited
UNITED STATES PATENTS

| 3,012,086 | 12/1961 | Vahldieck | 136/86 |
| 3,080,442 | 3/1963 | Hobert | 136/86 |
| 3,179,500 | 4/1965 | Bowen et al. | 136/86 UX |
| 3,278,268 | 10/1966 | Pfefferle, Jr. | 136/86 UX |
| 3,328,204 | 6/1967 | Grubb | 136/86 |
| 3,343,990 | 9/1967 | Giddy | 136/86 |
| 3,352,716 | 11/1967 | Lindstrom | 136/86 |

*Primary Examiner*—A. B. Curtis
*Attorneys*—Carl O. Thomas, Melvin M. Goldenberg, Frank L. Neuhauser, Oscar B. Waddell and N. J. Coenfeld ABSTRACT: A system for generating electrical energy reacts fuel and water to form hydrogen which is delivered to a fuel cell in an amount exceeding its requirements, the surplus hydrogen being burned to maintain the endothermic fuel-water reaction. Product water from the burning and fuel cell operations is recovered to continue the fuel-water reaction, which water is preheated by the electrolyte, which advantageously may be phosphoric acid.

Inventors:
Paul Chludzinski,
John W. Harrison,
by Carl O. Thomas
Their Attorney.

Inventors:
Paul Chludzinski,
John W. Harrison,
by Carl O. Thomas
Their Attorney.

SYSTEM AND PROCESS EMPLOYING A REFORMABLE FUEL TO GENERATE ELECTRICAL ENERGY

This application is a continuation of application, Ser. No. 546,326 filed Apr. 29, 1966, now abandoned.

Our invention relates to a process and system for the generation of electrical energy through the indirect use of a reformable fuel.

It is an object of our invention to provide a process and system for reliably generating electrical energy at low cost and high efficiency over extended periods.

It is another object to provide a process and system for electrical energy generation in which periodic supply of reformable fuel constitutes the sole logistic requirement.

It is still another object to provide a system for maintaining a functioning fuel cell in a state of dynamic equilibrium.

It is an additional object to provide a system for the controlled recovery of water from a fuel cell.

In one generic aspect our invention is directed to a process for generating electrical energy comprising, providing an electrolyte in ionically conductive relation between an anode and a cathode serving as electrodes of a fuel cell. Fuel is supplied to the fuel cell for electrochemical oxidation at the anode by reacting a mixture of water and reformable fuel in heat-receiving relation with a combustion zone to generate a reformate including hydrogen. The reformate so formed is delivered to the fuel cell. An oxidant is supplied to the fuel cell for electrochemical reduction at the cathode. Fuel and oxidant in excess of the fuel cell requirements are delivered to the combustion zone where they are exothermally united. Water vapor formed as a reaction product within the combustion zone and within the fuel cell is condensed and used to replenish water consumed in generating the reformate.

Our system for generating electrical energy is in one aspect comprised of a fuel cell which includes a cathode, an anode, electrolyte means interposed between the cathode and anode, and means forming a hydrogen chamber adjacent the anode. The system is also comprised of reforming means including burner means. Means are provided for supplying water and fuel to the reforming means including water vapor condensation means. Means are provided for supplying reformate from the reforming means to the hydrogen chamber means. Means for supplying fuel to the burner means are included as well as means for delivering water vapor from the fuel cell and the burner means to the condensation means.

Figure 2:
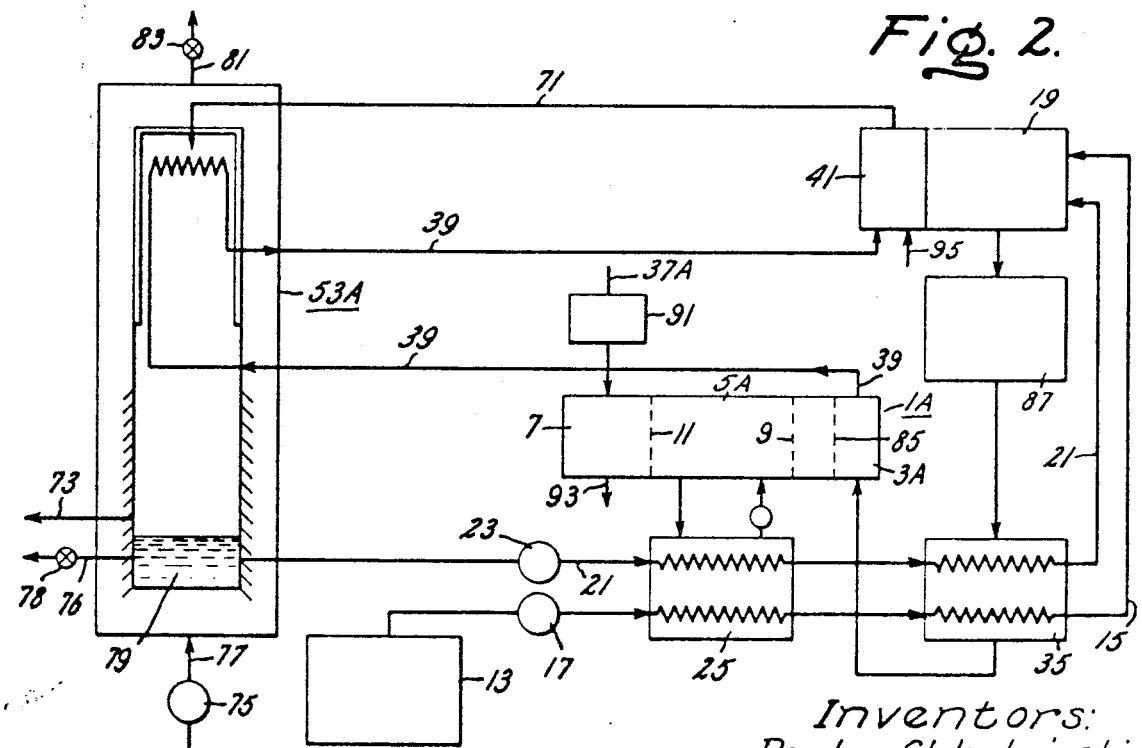
Figure 3:
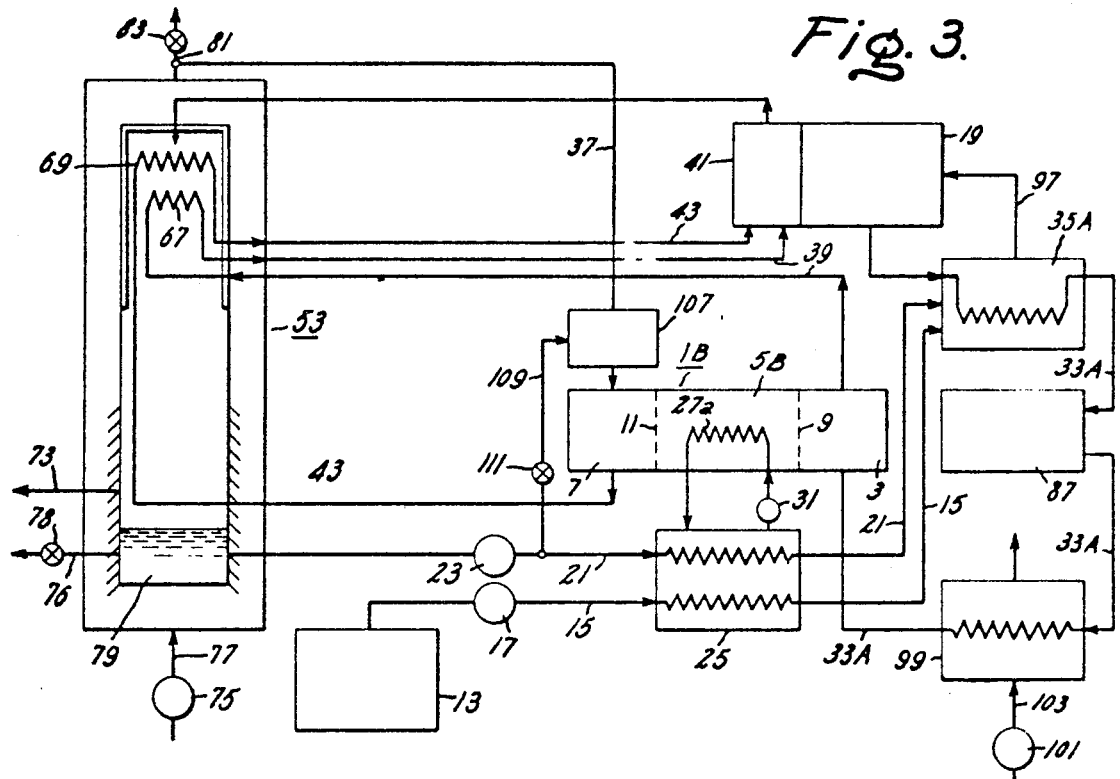
Figure 4:
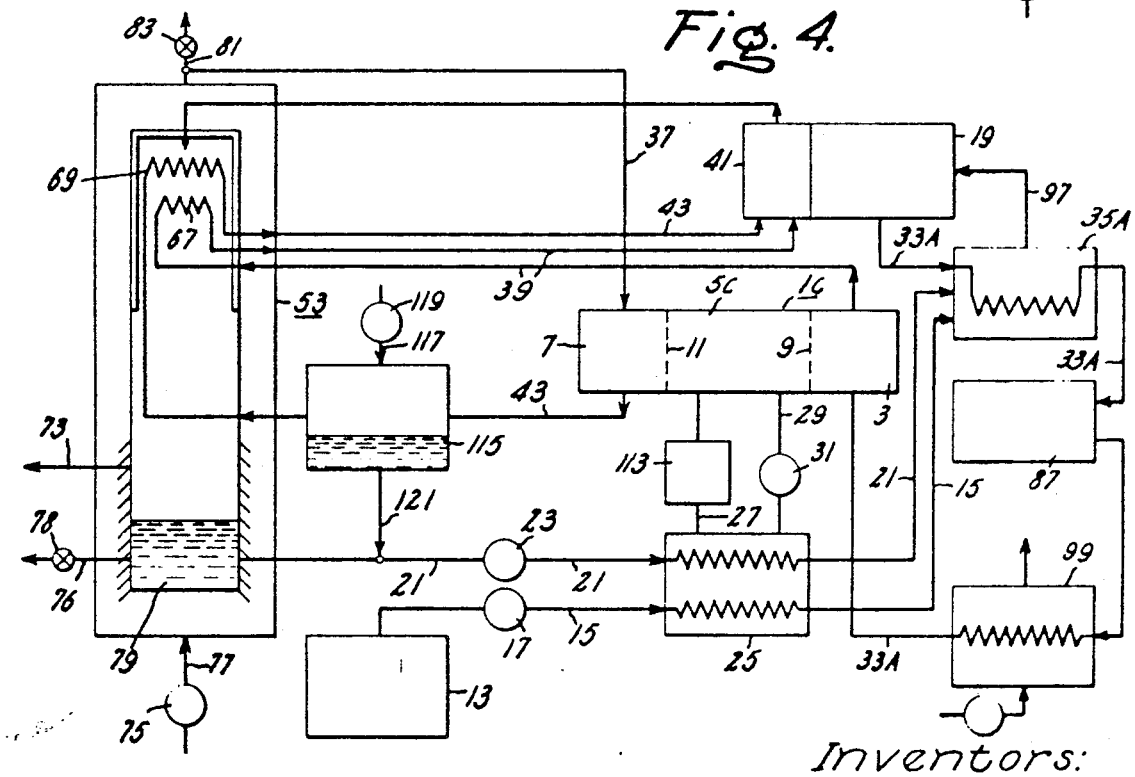

Our invention may be better understood by reference to the following detailed description considered in conjunction with the drawings, in which FIG. 1 is a schematic diagram of a system according to our invention having utility with fuel cells having a free aqueous acid electrolyte and an operating temperature well above ambient, FIG. 2 is a schematic diagram of a system having utility with free aqueous alkaline electrolyte fuel cells, FIG. 3 is a schematic diagram of a system having utility with fuel cells having an immobilized electrolyte, and FIG. 4 is a schematic diagram of a system having utility with fuel cells having a free aqueous acid electrolyte and an operating temperature near ambient.

FIG. 1 illustrates a preferred system for generating electrical energy from a reformable fuel using a fuel cell having a free aqueous acid electrolyte and intended to operate in a temperature range of from 200° to 450° F. The fuel cell 1 is schematically shown divided into a hydrogen chamber means 3, an electrolyte means 5, and an oxidant chamber means 7, and having an anode 9 interposed between the hydrogen chamber means and the electrolyte means and a cathode 11 interposed between the oxidant chamber means and the electrolyte means. Phosphoric acid electrolyte fuel cells are typical of conventional fuel cells having utility in the system. While the fuel cell is schematically illustrated as a single cell unit, it is appreciated that it may be comprised of a battery of cells.

In order to supply hydrogen to the hydrogen chamber means of the fuel cell a means 13 serving as a fuel source is provided. Conduit means 15 and pump means 17 are provided to deliver the fuel to reformer 19. Simultaneously water is delivered to the reformer by conduit means 21 and pump means 23. A heat exchanger 25 is provided to reject heat from the fuel cell electrolyte means to the water and fuel being supplied to the reformer. Conduit means 27 and 29 and pump means 31 are provided to circulate the free aqueous acid electrolyte from the electrolyte means of the fuel cell to the heat exchanger.

As employed in this application the term "reformer" refers to any conventional apparatus for generating hydrogen by the reaction of water and reformable fuel. Of the known reformable fuels hydrocarbons and alcohols are generally preferred for economic reasons. It is preferred to employ a catalytic reformer employing a conventional reforming catalyst such as may be obtained commercially from Engelhard Industries, Girdler, the Institute of Gas Technology, etc. In reforming water and hydrocarbon or alcohol mixtures, such reformers are typically operated in temperature ranges of from 800° to 1,400° F., depending on the specific feed stock and catalyst chosen. The reformer reacts the water and fuel mixture to generate hydrogen having quantities of water, methane, carbon dioxide, carbon monoxide, and various trace materials entrained. While only one reformer is shown in FIGURE 1 it is appreciated that it may be desirable to employ two or more reformers in series having like or differing catalysts in order to obtain most efficient hydrogen generation.

The hydrogen generated in the reformer together with the entrained materials —conventionally referred to in aggregate as "impure hydrogen"—is circulated from the reformer to the hydrogen chamber means through conduit means 33. Since phosphoric acid electrolyte fuel cells are relatively insensitive to reformate impurities such as carbon monoxide, no means for further refining the feed stock is necessary. Inasmuch as reforming is generally performed at temperatures well in excess of the maximum desired operating temperature of the fuel cell, a heat exchanger 35 is provided which transfers heat from the reformate to the water and fuel being delivered to the reformer. This achieves the dual advantages of reducing the amount of heat energy which must be supplied to achieve reforming and of reducing the temperature of the feed stock entering the hydrogen chamber means to a level at or near that of the fuel cell. Having the feed stock enter the fuel cell at a temperature near the operating temperature minimizes the generation of thermal stresses within the fuel cell which may ultimately contribute to structural failures over extended periods of use.

Conduit means 37 is provided to deliver an oxidant to the oxidant chamber means. As is well understood in the art, when an electrical load is connected across the electrodes of the fuel cell, at least a portion of the oxidant supplied to the oxidant chamber means and the hydrogen supplied to the hydrogen chamber means will be electrochemically reacted at the cathode and anode, respectively. In the specific system shown where the fuel cell employs a free aqueous acid electrolyte the hydrogen in the hydrogen chamber means will be oxidized to hydrogen ions, which will enter the electrolyte. The electrons lost in oxidation are supplied to the anode for transport through an external circuit, not shown, to the cathode. Simultaneously, the oxidant in the oxidant chamber means is reduced. Where oxygen or air is used as the oxidant the reaction product formed will be water. At any given fuel cell operating temperature an equilibrium will be established between the electrolyte and the water vapor being rejected to the oxidant chamber means such that there will be no net tendency by the electrolyte to either lose or gain water.

In order to achieve most efficient fuel cell performance it is preferred to supply fuel and oxidant to the fuel cell at a rate in excess of the rate of consumption. For this purpose a conduit means 39 is provided which delivers excess fuel along with incidental entrained impurities to a burner 41. A conduit means 43 is provided to deliver excess oxidant, any accompanying impurities (such as nitrogen from air), and water vapor to the burner. The excess oxidant and excess fuel are exothermally reacted at the burner to heat the reformer to the desired operating temperature. In some applications it may be desirable to reform and deliver to the hydrogen chamber means of the fuel cell less excess fuel than may be required by the burner. In such instance an optional conduit means 45 is provided extending from the fuel conduit means upstream of the reformer to the conduit means 39. Control means 47 is provided to adjust the flow rate of the unreformed fuel to the burner. Provision of such conduit means 45 offers the advantage of allowing fuel to be supplied to the burner without reforming. This in turn means that the capacity of the reformer can be proportionately reduced.

When no electrical energy is being drawn from the fuel cell, none of the fuel or oxidant supplied to the fuel cell will be consumed. Where air is being used as an oxidant, the oxidant cost is sufficiently negligible that it may be vented to the atmosphere without significant economic penalty. However, for most applications it will be desirable to prevent inefficient utilization of fuel. According to one aspect of the invention, fuel waste under low- or no-load conditions can be avoided merely by regulating the flow of fuel to the reformer in relation to the amount of electrical energy supplied by the fuel cell. Where it is preferred to operate the system at a relatively steady feed rate it may be desirable to include optional conduit means 49 for recirculating fuel from the excess fuel conduit means 39 to the reformable fuel conduit means 15. The rate at which the excess fuel is recirculated is controlled by flow regulator 51. The flow regulator is preferably a device for sensing the amount of electrical energy being supplied by the fuel cell and recirculating fuel in inverse relation thereto. In its simplest form the flow regulator could be a solenoid-controlled valve in which the solenoid on actuation biases the valve toward closed position. By placing the solenoid in a circuit with the fuel cell and in series with an electrical load, automatic recirculation of excess fuel can be achieved under low- or no-load conditions. It is appreciated that any conventional manual or automatically actuable flow regulator may be employed.

In order to provide a system in which the reformable fuel constitutes the sole logistic requirement it is necessary to include means to replenish the water supplied to and consumed by the reformer. To accomplish this function of our system a water recovery unit 53 is provided. The water recovery unit, schematically shown in FIG. 1, is provided with an inner body portion 55 and an outer body portion 57. The inner body portion is divided into an upper section 59 and a lower section 61. The upper section is lined with suitable thermal insulation at 63 to prevent heat transfer between the inner and outer surfaces thereof. The lower section is preferably adapted to efficiently transfer heat between the inner and outer surfaces thereof. As shown heat transfer fins 65 are provided to aid in dissipating heat from the outer surface.

Conduit means 39 and 43 delivering excess fuel and oxidant, respectively, from the fuel cell to the burner are provided with heat transfer portions 67 and 69, respectively, within the upper section of the inner body portion. Conduit means 71 delivers reaction products from the burner and fuel cell along with other gases that may have been entrained in the reformate (such as carbon dioxide, carbon monoxide, hydrocarbon, etc.) or in the oxidant (such as nitrogen, carbon dioxide, etc. to the upper section of the inner body portion. Heat is transferred from the burner exhaust to the fuel and oxidant being supplied to the burner. A portion of the water vapor present in the burner exhaust may condense on the heat transfer portions of the conduit means within the inner body portion.

A conduit means 73 is provided in the lower section of the inner body portion to expel the uncondensed portion of the burner exhaust. While some portion of the water vapor in the burner exhaust is condensed in the upper section, the bulk of the water vapor is condensed from the burner exhaust in the lower section. A blower 75 and duct means 77 are connected to the outer body portion to deliver air into heat transfer relation with the lower section. This serves the dual function of heating the air supplied and of condensing a large portion of water vapor present in the burner exhaust gas within the lower section. The condensate is collected in the inner body portion at 79. Water supply conduit means 21 is connected to the inner body portion to receive the condensate. Under most temperature and humidity conditions of operation more than enough water may be condensed to replenish the water consumed in reforming. Under such conditions water may be taken from the system for other uses. For this purpose a conduit means 76 and valve means 78 are illustrated.

The heated air is exhausted from the outer body portion at 81. The heated air may be vented to the atmosphere. It is preferred, however, that this warmed air be utilized as the oxidant feed for the fuel cell. Accordingly, as shown valve means 83 is provided to regulate the rate at which air is being vented to the atmosphere, and conduit means 37 is shown connected in air receiving relation.

As is well understood in the art concentrated phosphoric acid electrolyte tends to become viscous at ambient temperatures. Accordingly, when shutting the fuel cell down, it will in many circumstances be desirable to dilute the phosphoric acid. It is immaterial whether the phosphoric acid is diluted before or after the electrical load is removed. It is preferred, however, that the phosphoric acid be diluted before it has cooled sufficiently to become viscous. For this purpose a conduit means 80 is shown branching from the water supply conduit means 21. This conduit is controlled by a valve means 82, which allows water to be delivered to the heat exchanger 25 to dilute the electrolyte. When the fuel cell is shut down the phosphoric acid will be sufficiently dilute as to be easily circulated. At the same time the excess water in the electrolyte poses no difficulty in starting up the fuel cell. The excess water will be rejected from the electrolyte and will be exhausted from the fuel cell in the form of water vapor, since the fuel cell is self-regulating as respects electrolyte concentration.

FIG. 2 schematically illustrates a system for generating electrical energy similar to that shown in FIGURE 1, but differing in the use of a fuel cell 1A having a free aqueous alkaline electrolyte means 5A. Identical portions of the systems shown in FIGURES 1 and 2 are assigned like reference numerals. Potassium hydroxide is typical of a conventional free aqueous alkaline fuel cell electrolyte. Potassium hydroxide is highly sensitive to small concentrations of carbon monoxide. Accordingly, the fuel cell is provided with a modified hydrogen chamber means 3A which includes a hydrogen diffusion barrier 85. The diffusion barrier selectively permits the penetration of hydrogen while preventing penetration by other gases. Conventional diffusion barriers are constructed of palladium or palladium alloys in thin sheet or foil form.

Aqueous alkaline electrolyte fuel cells are generally operated at relatively high temperatures —e.g., up to approximately 500° F. Accordingly, the system of reforming to generate hydrogen and for circulating the electrolyte is substantially identical to the structural system illustrated in FIG. 1, differing only by the inclusion of conventional carbon monoxide reducing means 87. The means for reducing the carbon monoxide content of the hydrogen stream is employed, since carbon monoxide tends to poison the electrocatalyst incorporated in the anode. No carbon monoxide reducing means is shown in FIG. 1, since phosphoric acid electrolyte fuel cells are able to withstand carbon monoxide poisoning. Other types of acid electrolytes are more susceptible to carbon monoxide poisoning, and alkaline electrolytes are very susceptible to carbon monoxide poisoning. Anyone of a variety of conventional means for reducing carbon monoxide content may be employed. A preferred apparatus is a carbon monoxide shifter which reacts carbon monoxide with water to form carbon dioxide and hydrogen. Another device which may be employed is a methanator, a device which reacts carbon monoxide with hydrogen to generate methane and water. It is appreciated that a plurality of carbon monoxide reducing means of like or differing character may be employed in series, if desired.

The hydrogen stream entering the hydrogen chamber means through conduit means 33 contains hydrogen, water vapor, methane, carbon dioxide, and only small quantities of carbon monoxide. The entering stream is separated from the anode by the diffusion barrier. The hydrogen present diffuses through the barrier and is free to react at the anode.

The reformate portions not passing through the diffusion barrier are circulated to the burner through conduit means 39. Sufficient hydrogen and combustible reformate impurities will remain in the portion of the reformate not passing through the diffuser so that it can be burned downstream of the fuel cell.

If desired the oxidant supply to the fuel cell and the water recovery unit employed in the system shown in FIG. 1 could be employed in the FIG. 2 system. Nevertheless, to teach the use of an alternate structural arrangement applicable to either of the systems shown in FIGS. 1 and 2, FIG. 2 illustrates a modified water recovery unit 53A. This unit differs from unit 53 in omitting conduit means 43 for excess oxidant. As shown oxidant is supplied to the fuel cell 1A through oxidant conduit means 37A having a carbon dioxide reducing means 91 included as an optional component thereof. Excess oxidant is shown vented to the atmosphere upon leaving the oxidant chamber means at 93. Oxidant is shown delivered to the burner at 95. It is unnecessary to provide any conduit to deliver oxidant to the burner, since the burner may be designed to aspirate the required amount of oxidant from the air.

FIG. 3 illustrates a system similar to that shown in FIG. 1, but differing in employing a fuel cell 1B having an immobilized electrolyte means. The immobilized electrolyte may take the form of an acid or base held immobilized by capillary forces in a porous matrix or, alternately, the immobilized electrolyte may be an ion exchange resin. Fuel cells employing such electrolytes are well known in the art and are typically operated at temperatures ranging from ambient to 200° F. The fuel cell differs from fuel cell 1 in that heat is transferred from the electrolyte means to the heat exchanger 25 by circulating a coolant through conduit means 27a. The fuel cell employed in the Gemini spacecraft is exemplary of a suitable conventional fuel cell providing for heat transfer from the electrolyte means by circulation of a coolant.

Transfer of heat from the reformate being circulated to the hydrogen chamber means through conduit means 33A to the water and reformable fuel is accomplished in exchanger 35A. Heat exchanger 35A is illustrated merely to show an alternative for heat exchanger 35. Heat exchanger 35A differs from heat exchanger 35 in that the incoming fuel and water are mixed within the heat exchanger. The combined fuel and water stream is delivered to the reformer through conduit means 97.

Downstream of the heat exchanger 35A the reformate is passed through a carbon monoxide reducing means 87 and then through a heat exchanger 99. The purpose of the heat exchanger is to reduce the temperature of the reformate so that it approaches the temperature of the fuel cell. An air duct 103 having a blower 101 therein is provided to effect indirect heat transfer with the air. The warmed air is shown rejected at 105.

The heat exchanger 99 is an optional element. It could be omitted if the carbon monoxide reducing means 87 were mounted upstream of the heat exchanger 35A between the reformer and the heat exchanger. The heat exchanger 99, however, would still perform a useful function in further controlling the temperature of the reformate even if the carbon monoxide reducing means are repositioned.

The oxidant supply and water recovery means employed in the FIG. 3 system are substantially identical to that shown in FIG. 1. An important difference, however, is the inclusion of humidifier 107. Immobilized electrolyte fuel cells are more sensitive than free aqueous electrolyte fuel cells to loss of water content. In order to prevent water losses it is desireable to insure that the humidity of the reactant streams approach saturation. Even if the air supplied to the water recovery unit 53 were initially at 100 percent humidity, air leaving the water recovery unit and being supplied to the oxidant chamber means through conduit means 37 would not be at the same high humidity level. This is because the air is heated in the water recovery unit and hence capable of holding more water in vapor form on exhaust than on entrance. To ensure that sufficient water is present at the humidifier at all times a conduit means 109 having a flow control means 111 is provided extending between water supply conduit means 21 and the humidifier.

FIG. 4 illustrates a system similar to that shown in FIG. 1, differing in the use of a fuel cell 1C having an electrolyte means 5C which utilizes a free aqueous acid electrolyte adapted to operate at temperatures from ambient up to about 200° F. Sulfuric acid electrolyte fuel cells are exemplary of conventional fuel cells of this type. The system for circulating the electrolyte and of rejecting heat to the water and reformable fuel is substantially similar to the system shown in FIG. 1. One difference is the addition of an acid conditioning means 113. As is well understood in the art such means allow the strength of the acid to be monitored and adjusted as well as allowing the removal of any incidental impurities that may be detected.

The water recovery unit, the reformer, and the means for treating the reformate between the reformer and the hydrogen chamber means are identical to the system shown in FIG. 3. As an alternative means for condensing a portion of water vapor formed as a reaction product formed by the fuel cell, the conduit means 43 is provided with a direct heat exchanger 115. Duct means 117 and blower 119 deliver ambient air to mix directly with the excess oxidant and reaction products from the oxidant chamber means. This results in cooling of the exhaust stream and condensation of at least a portion of the water vapor present. Conduit means 121 conducts the condensate from the heat exchanger to the water supply conduit means 21. The heat exchanger 115 is an optional element of our system.

While we have disclosed the preferred form of our inventive systems along with certain alternatives, it is appreciated that it may be desirable to further modify the systems. For example, each of the fuel cells shown are operated on air. The fuel cells could alternatively be operated on any other conventional oxidant. In the system shown in FIG. 1 this could be accomplished merely by connecting the conduit means 37 to a separate oxidant source means. In certain systems it may be desired to use ambient air relying entirely on natural convective air currents for circulation. In such instance the oxidant chamber means could be omitted from the fuel cells shown. The air used for the various heat exchange functions would then be separate from the air used as a fuel cell reactant. While the humidifier is shown with conduit means to allow for water circulation thereto, this is not necessary. The humidifier could be provided with a water reservoir to allow use without continuous addition of water. It is considered that it would be well within the skill of the art to provide additional pump means and flow regulation means where desired in the illustrated systems. Further, in certain circumstances it may be possible to omit one or more of the pump means and valve means illustrated. For example, where the water recovery unit is located above the reformer, it may not be necessary to provide a pump means therebetween.

In the practice of our process it is preferred to generate a hydrogen stream for oxidation in a fuel cell rather than to supply hydrogen directly. It is preferred that the hydrogen stream be generated by reforming a mixture of water and a low-cost reformable fuel, such as hydrocarbon or alcohol. Economic considerations favor the use of fluent hydrocarbons, such as those having an approximate average molecular weight less than eicosane. Hydrocarbons having an average molecular weight less than that of dodecane are generally most preferred in view of their greater reactivity. It is preferred to use hydrocarbons from the alkane and alkene series. The sulfur content of the fuel should be maintained less that 4,000 p.p.m. and preferably less than 1,000 p.p.m. It is most preferred to utilize fuels having a sulfur content of less than 40 p.p.m. It is then apparent that any of a wide variety of commercially available hydrocarbons may be employed ranging from Bunker C crude oil to commercial gasolines to LPG to natural gas. In certain applications where the emphasis is to be placed on water recovery rather than fuel cost it may be desirable to utilize one or more alcohol derivatives of the aforenoted hydrocarbons. Alcohols provide the advantage of forming somewhat larger proportions of water while consuming somewhat smaller amounts of water in reforming. This allows somewhat less stringent water recovery procedures than may be required with hydrocarbons. While hydrocarbons and alcohols are specifically set out as suitable reformable fuels, being economically preferred, it is appreciated that any reformable fuel known to the art may be employed. As used herein the term "reformable" refers to any fuel which can be reacted with water to generate hydrogen.

The water used in reforming may be fresh or saline and is preferably tapwater. The proportion of water to hydrocarbon should be maintained at a ratio of 2.71 to about 6.45 molecules of water per carbon atom in order to achieve maximum utilization of the fuel, although somewhat lower ratios may be used with alcohols. The water and fuel may be reacted in any conventional apparatus for generating hydrogen. It is preferred to react the hydrocarbon or alcohol and water in the presence of a reforming catalyst at temperatures of from 800° to 1,400° F. and at approximately atmospheric pressure. If the pressure is varied corresponding variation in reforming temperatures may be expected. In order to avoid the disadvantages of operating at high pressure, it is preferred to maintain the feed under the minimum positive pressure consistent with the desired feed rate. It is recognized that commercially available reforming means require more water to be consumed in reforming—that is, incorporated in the feed—than is actually reacted with the fuel.

The reformate may be chemically modified to meet the fuel needs of the fuel cell. For example, with conventional catalytic reforming of water and hydrocarbon or alcohol mixtures the reformate will be comprised of hydrogen, water vapor, carbon dioxide, carbon monoxide, methane, and trace amounts of impurities and miscellaneous hydrocarbons or alcohols. Except for phosphoric acid electrolyte fuel cells, it is necessary to reduce the carbon monoxide content of the reformate. Certain types of fuel cells are more sensitive than others to carbon monoxide. The exact amounts of carbon monoxide permissible in the hydrogen stream supplied to the fuel cell will depend on the particular type of electrodes and electrolyte as well as the temperature chosen for operation. It is preferred to use one or both of two conventional techniques to reduce the carbon monoxide content of the reformate. According to one technique the carbon monoxide and hydrogen present in the stream are reacted in the presence of a catalyst to generate methane and water. This reaction, conventionally termed methanation, is typically conducted at temperatures in the range of from 400° to 450° F. The remaining technique is conventionally referred to as carbon monoxide shifting. According to this reaction, preformed at temperatures in the range of form 400° to 750° F., carbon monoxide and water are reacted in the presence of a catalyst to generate hydrogen and carbon dioxide. It is appreciated that additional purification of the reformate by conventional techniques could be used without departing from the purview of our invention.

In operating a fuel cell according to our invention oxidant is supplied to the cathode of the fuel cell and hydrogen from the reformate is supplied to the anode of the fuel cell. Electrical energy is obtained from the fuel cell, as is well understood, by attaching an electrical load between the anode and the cathode. In order to protect the fuel cell from thermal stresses, it is preferred to at least partially equilibrate the temperature of the reactants with the temperature of the fuel cell. In the case of the reformate it is necessary to remove heat to achieve equilibration. It is preferred to reject heat from the reformate upstream of the fuel cell to the water and/or reformable fuel being delivered to the reformer. With fuel cells operating below about 200° F. it may also be desirable to reject a portion of the heat from the reformate to the atmosphere. Equilibration of the oxidant with the fuel cell is achieved by adding heat to the oxidant upstream of the fuel cell. The heat supplied to the oxidant may be the heat rejected from the reformate. A more preferred method of heating the oxidant will be subsequently described. In use, the fuel cell will become heated due to internal resistive power losses in the electrolyte means and due to polarization at the electrodes. To prevent overheating it is necessary to reject heat from the electrolyte means. This may be accomplished by circulating the electrolyte or by circulating a coolant in heat transfer relation with the electrolyte. It is preferred to reject heat from the electrolyte of the fuel cell to the water and/or fuel mixture being supplied to the reformer.

In order to achieve most efficient operation of the fuel cell it is desirable that fuel and oxidant be supplied at a rate in excess of the rate of consumption. The excess fuel and oxidant is preferably delivered to a combustion zone in heat transfer relation to the reformer. The excess fuel and oxidant may then be exothermally combined to heat the reformer. It may be desirable to supply fuel to the combustion zone in addition to the excess fuel received from the fuel cell. Also, it may in certain circumstances be desired to vent the excess oxidant from the fuel cell to the atmosphere and to supply oxidant separately to the combustion zone. When the fuel cell is delivering no or only low amounts of electrical energy, it may be that the amount of excess fuel received from the fuel cell will be more than is necessary for heating the reformer. In such instance a portion of the excess fuel may be recirculated to the reformable fuel upstream of the reformer. This will then not only conserve the fuel not consumed by the fuel cell but will also slow the rate at which additional reformable fuel is supplied to the reformer.

In order to achieve water recovery and maximum thermal efficiency it is necessary to cool the combustion products and entrain gases leaving the combustion zone. For purposes of thermal efficiency it is preferred to reject heat from the combustion products to the excess oxidant and excess fuel being supplied to the combustion zone. This may condense at least a portion of the water vapor present in the combustion products. To recover additional water from the combustion products it is preferred that heat be transferred from the combustion products to a cooling air stream. This air stream, subsequent to heating, may be used as the oxidant source for the fuel cell. At least a portion of the water that is condensed from the combustion products may be fed to the reformer to replenish the water consumed in reforming. In those applications where the excess oxidant, excess fuel, and reaction products from the fuel cell are fed to the combustion zone, condensation of the combustion products will condense both the water vapor formed as a reaction product in the fuel cell and in the combustion zone. It is, of course, appreciated that the water vapor formed as a reaction product in the fuel cell could be separately condensed, if desired.

As specific illustration of our invention, the system shown in FIG. 1 is provided with a fuel cell 1 comprised of electrolyte means 5 providing a spacing of one-sixteenth inch between each anode and each cathode. The electrolyte is 92.4 percent by weight phosphoric acid, which is maintained at a temperature of 300° F. during fuel cell use. The electrodes are formed according to the teaching of commonly assigned application, Niedrach et al., Ser. No. 232,689, filed Oct. 24, 1962, now U.S. Pat. No. 3,432,355. Each anode is provided with a platinum catalyst loading of 3 mg./cm.$^2$ while each cathode is provided with a platinum catalyst loading of 37 m.g./cm.$^2$ The electrodes are provided with an active surface area of 10 inches on a side or 100 square inches. The fuel cell employed is assembled of a stack of 152 individual cells. The stack generates 3.5 kw. of useful electrical energy which may be supplied to an external electrical load while 3.75 kw. of energy is dissipated in the form of heat.

The feed stock supplied from the fuel source means 13 is JP-4, which has a carbon-to-hydrogen ratio approximating that of nonane. The fuel contains 80 p.p.m. sulfur. Fuel is supplied to the reformer at a rate of 5.32 gram moles per hour and at ambient temperature (70° F.). Water is supplied to the reformer at 223.4 gram moles per hour and at an initial temperature of 114° F.

Phosphoric acid is circulated through conduit means 27 to the heat exchanger 25 at a temperature of 300° F. and is returned to the electrolyte means at a temperature of 285° F. The fuel and water stream leave the heat exchanger 25 at a temperature of 250° F. The reformer 19 is maintained at an operating temperature of 1,200° F. The reformer is provided with a conventional Institute of Gas Technology catalyst which delivers a reformate consisting essentially of 126.5 gram moles/hour hydrogen (which is 30 percent in excess of the fuel cell requirements), 13.1 gram moles/hour carbon monoxide, 33.3 gram moles/hour carbon dioxide, 1.4 gram moles/hour methane, and 143.8 gram moles/hour water vapor. The reformate is conducted through conduit means 33 to heat exchanger 35 at a temperature of 1,200° F. The reformate leaves the heat exchanger 35 at a temperature of 300° F. while the water in conduit means 21 leaves in the form of steam at 1,000° F. and the fuel in conduit means 15 leaves at 500° F.

The excess fuel and entrained gases from the reformate leave the hydrogen chamber means 3 of the fuel cell at a temperature of 300° F. and are increased in temperature in the water recovery unit to 1,000° F. Simultaneously oxygen from air is supplied to the oxidant chamber means 7 of the fuel cell at a flow rate of 100 gram moles per hour (twice the rate of consumption in the fuel cell). The excess air along with fuel cell reaction products in rejected through conduit means 43 at a temperature of 300° F. to the water recovery unit. The excess oxidant is supplied from the water recovery unit to the burner at a temperature of 1,000° F.

The flame temperature of the burner 41 is 1,850° F. and the combustion products and entrained gases exit from the burner through conduit means 71 at a temperature of 1,250° F. The burner exhaust includes 272.1 gram moles/hour water vapor, 47.8 gram moles/hour carbon dioxide, 376 gram moles/hour nitrogen, 26.6 gram moles/hour oxygen. The gas exhausting through conduit means includes 26.6 gram moles/hour oxygen, 47.8 gram moles/hour carbon dioxide, 376 gram moles/hour nitrogen, and 48.7 gram moles/hour water vapor. The difference between the water vapor supplied in the burner exhaust and the water vapor rejected through conduit means 73 is the water condensed to replenish the water consumed in the reformer. The temperature of the gas exhausted through conduit means 73 is 114° F.

It is noted that the system requires no water to be externally supplied. The overall thermal efficiency is 43 percent.

While our invention has been specifically described with reference to certain preferred embodiments, it is appreciated that numerous variations will readily suggest themselves to those skilled in the art. It is accordingly intended that the scope of our invention be determined with reference to the following claims.

What I claim and desire to secure by Letters Patent is:

1. A process of generating electrical energy comprising:
   providing an electrolyte in an ionically conductive relation between an anode and a cathode of a fuel cell;
   operating said fuel cell at an operating temperature above the boiling point of water whereby the excess heat produced in said cell may be utilized to improve the efficiency of the cell including:
   supplying fuel to the fuel cell for electrochemical oxidation at the anode, including:
   reacting a mixture of water and reformable fuel in heat receiving relation with a combustion zone to generate a reformate including hydrogen, and
   delivering the reformate to the fuel cell;
   supplying oxidant to the fuel cell for electrochemical reduction at the cathode;
   delivering such fuel as is in excess of the fuel cell requirement and such oxidant as is in excess of the fuel cell requirement to the combustion zone;
   exothermally uniting such excess fuel and such oxidant within the combustion zone;
   condensing such water vapor as is formed within the combustion zone and within the fuel cell;
   rejecting heat from the fuel cell electrolyte to the condensed water vapor; and
   replenishing such water as is consumed in generating the reformate with the heated, condensed water vapor.

2. A process according to claim 1 further including:
   rejecting heat from the reformate from the combustion zone to the condensed water vapor.

3. A process according to claim 1 wherein:
   said electrolyte is phosphoric acid; and
   said oxidant is air;

4. A process according to claim 3 wherein:
   said phosphoric acid is heated before provision to said fuel cell; and,
   said phosphoric is diluted prior to any cooling thereof, whereby to preclude the phosphoric acid from solidifying when the process is halted.

5. A process according to claim 1 wherein:
   said electrolyte is potassium hydroxide; and
   said oxidant is air.

6. A process according to claim 1 wherein:
   said electrolyte is immobilized and said oxidant is air; and further including:
   reducing the carbon monoxide content of the reformate before delivery to the fuel cell; and
   humidifying the air supplied to the fuel cell.

7. A system for generating electrical energy comprising:
   a fuel cell formed of a cathode, an anode and an electrolyte means interposed between said cathode and anode;
   means forming a hydrogen chamber adjacent said anode;
   means operating said cell at a temperature above the boiling point of water whereby excess heat from said cell may be utilized to convert water formed in said cell into water vapor including:
   reforming means including burner means;
   means, including water vapor condensation means, for supplying water and fuel to said reforming means;
   means for supplying reformate from said reforming means to said hydrogen chamber means;
   means for supplying oxidant and fuel to said burner means;
   means for delivering water vapor produced in said fuel cell and in said burner means to said condensation means; and
   means for rejecting heat from said electrolyte means to said means for supplying water and fuel to said reforming means.

8. A system according to claim 7 further including:
   means for rejecting heat from the reformate from the combustion zone to said means for supplying water and fuel to said reforming means.

9. A system according to claim 8 wherein:
   said electrolyte is phosphoric acid; and further including:
   means for selectively adding water to said phosphoric acid electrolyte.

10. The combination comprising:
    a fuel cell formed of a cathode, an anode, electrolyte means interposed between said cathode and said anode to provide ionic conductivity therebetween, and means forming a hydrogen chamber adjacent said anode,
    reforming means including burner means,
    water recovery means including an inner body portion and an outer body portion, said inner body portion including an upper section and a lower section, means inhibiting heat transfer between said upper section and said outer body portion, and means facilitating heat transfer between said lower section and said outer body portion, means delivering reformate from said reforming means to said hydrogen chamber means, first conduit means extending between said hydrogen chamber means and said burner means including a portion mounted within said upper section, second conduit means for delivering combustion products from said burner means to said upper section, and means circulating air between said inner body portion and said outer body portion.

11. The combination according to claim 10 in which said fuel cell includes means forming an oxidant chamber adjacent said cathode and said combination additionally including third conduit means for delivering air from an upper portion of said outer body portion to said oxidant chamber means.

12. The combination according to claim 10 in which said fuel cell includes means forming an oxidant chamber adjacent said cathode and said combination additionally including third conduit means for delivering air from an upper portion of said outer body portion to said oxidant chamber means and fourth conduit means extending between said oxidant chamber means and said burner means including a portion mounted within said upper section.